(12) United States Patent
Lee et al.

(10) Patent No.: US 9,773,132 B2
(45) Date of Patent: Sep. 26, 2017

(54) TAG ANTI-COLLISION METHOD, READER APPARATUS AND SYSTEM FOR RFID SYSTEMS WITH MULTI-PACKET RECEPTION CAPABILITY

(71) Applicant: RESEARCH & BUSINESS FOUNDATION SUNGKYUNKWAN UNIVERSITY, Suwon-si (KR)

(72) Inventors: Tae Jin Lee, Suwon-si (KR); Yun Min Kim, Suwon-si (KR); Ji Hyoung Ahn, Uiwang-si (KR); Se Houn Lee, Uiwang-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 66 days.

(21) Appl. No.: 15/044,345

(22) Filed: Feb. 16, 2016

(65) Prior Publication Data

US 2016/0239692 A1 Aug. 18, 2016

(30) Foreign Application Priority Data

Feb. 13, 2015 (KR) ........................ 10-2015-0022348

(51) Int. Cl.
*G06K 7/10* (2006.01)
*G06K 7/00* (2006.01)
*G06K 19/07* (2006.01)

(52) U.S. Cl.
CPC ....... *G06K 7/10029* (2013.01); *G06K 7/0008* (2013.01); *G06K 7/0095* (2013.01); *G06K 7/10069* (2013.01); *G06K 19/0723* (2013.01)

(58) Field of Classification Search
CPC ............. G06K 7/10029; G06K 7/0008; G06K 7/10356; G06K 7/0095; G06K 19/0723; G06K 7/10069
(Continued)

(56) References Cited

U.S. PATENT DOCUMENTS

2011/0006885 A1* 1/2011 Park ...................... G06K 7/0008
340/10.3
2013/0222118 A1* 8/2013 Felemban ................ G06K 7/01
340/10.2
(Continued)

FOREIGN PATENT DOCUMENTS

KR 10-2008-0001691 A 1/2008
KR 10-0795577 B1 1/2008
(Continued)

OTHER PUBLICATIONS

Se Houn Lee, et al., "Efficient MAC Protocol for Multipacket Reception in RFID System." The Korean Institute of Communications and Information Sciences 2014' Winter Conference, Yongpyung, Korea, 2014 (3 pages in Korean with English translation).
(Continued)

*Primary Examiner* — Ali Neyzari
(74) *Attorney, Agent, or Firm* — NSIP Law

(57) ABSTRACT

Provided is a method of preventing collision between a plurality of RFID tags by an RFID reader. An anti-collision method by a tag reader apparatus in an RFID system including a plurality of RFID tags, includes changing a length of a collision recovery slot in the collision recovery slot which successfully identifies a plurality of tags even though at least two tags simultaneously replied in one slot to cause collision so that data transmission of at least one identified tag is achieved.

19 Claims, 7 Drawing Sheets

(58) Field of Classification Search
USPC .................................... 340/10.2, 10.3, 10.1
See application file for complete search history.

(56) References Cited

U.S. PATENT DOCUMENTS

2016/0328583 A1\* 11/2016 Elsaid Ibrahim .. G06K 7/10029
2016/0328638 A1\* 11/2016 Elsaid Ibrahim .... G06K 7/0095

FOREIGN PATENT DOCUMENTS

| KR | 10-2009-0049346 A | 5/2009 |
|----|-------------------|--------|
| KR | 10-2010-0011711 A | 2/2010 |
| KR | 10-1007084 B1 | 1/2011 |
| KR | 10-2011-0027423 A | 3/2011 |

OTHER PUBLICATIONS

Se Houn Lee, et al., "Efficient MAC Protocol for Multipacket Reception in RFID Systems." RCCIE 2014: Enhancement of Communication and Information Engineering Research through University-Idustry Collaboration Toward Sustainable Development in ASEAN Countries, Yogyakarta, Indonesia, 2014 (10 pages in English).
Korean Office Action issued on Aug. 21, 2015 in Counterpart Korean Application No. 10-2015-0022348 (4 pages in Korean).

\* cited by examiner

TAG ANTI-COLLISION METHOD, READER APPARATUS AND SYSTEM FOR RFID SYSTEMS WITH MULTI-PACKET RECEPTION CAPABILITY

CROSS-REFERENCE TO RELATED APPLICATIONS

This application claims the benefit of priority of Korean Patent Application No. 10-2015-0022348 filed on Feb. 13, 2015, all of which are incorporated by reference in their entirety herein.

BACKGROUND OF THE INVENTION

Field of the Invention

The present invention relates to a tag anti-collision method. More particularly, the present invention relates to a method of determining a frame size and a Medium Access Control (MAC) protocol capable of optimizing the use of a wireless resource in a multi-packet reception environment of a Radio Frequency IDentification (RFID) system.

Related Art

An RFID system is a contactless identification technology which identifies unique information of a tag attached to an object using a radio frequency. The RFID system includes a reader and a plurality of tags with identification information. The RFID tag has a very small size as compared with a smart card. The RFID tag is easily attached and inserted into various goods. A passive tag does not need power to be semi-permanently used. For this reason, the RFID system has been extensively applied to various industrial fields such as manufacturing, logistics management, military, retail, and transport management.

In the RFID system, in order to identify the tags, the reader sends an identification command to the tags. If the tags receive the identification command, the tags transmits a random 16-bit number (RN 16) generated thereby and unique identifier of the tags so that an identification procedure of the RFID system is performed. During the identification procedure, when a plurality of tags attempts the transmission simultaneously, collision is generated between transmission signals so that the reader has a difficulty in interpreting the received signals into data. Due to characteristics of the RFID system for identifying a plurality of objects within a short time, the above tag collision is a factor to increase an identification time in the RFID system. Accordingly, there is a need for a tag anti-collision protocol in order to solve a collision problem between tags.

A Framed Slotted ALOHA (FSA) based protocol is used as a representative anti-collision protocol and is a method that divides a time into frames including L slots having a fixed length where a tag transmits an RN16 and unique identifier of the tag in an arbitrary slot selected from the frame. The efficiency of the FSA based protocol is maximized when the number of tags to be identified is equal to a frame length L. However, it is difficult to change the frame length during a protocol operation. A Dynamic Framed slotted ALOHA (DFSA) has been developed to automatically adjust a frame length by estimating the number of tags to be identified. Further, an Adaptive Slot Adaptive Frame (ASAF) has been developed to reduce a time required for identifying the tags by reducing a length of an idle slot shorter than a length of a collision or success slot but slot lengths of the FSA and the DFSA are fixed.

In the anti-collision protocol according to the related art, it is assumed that a reader cannot identify data of tags due to collision between the tags when at least two tags simultaneously reply in the same slot. However, when a successive interference cancellation (SIC) is used, a plurality of original signals may be separated and identified from a composite signal received by the reader. This refers to a multi packet reception. There is a need to use at least two multi antennas for the purpose of the multi packet reception. In recent years, as a communication system using a multi antenna has been spotlighted, researches and studies have been performed toward a system performance when the multi antenna is applied to an RFID system. When the multi packet reception is used, unique identification information of an individual tag in a slot regarded as collision in the related art may be identified so that an identification rate of the tag is increased and a throughput of the RFID system may be improved. However, the existing anti-collision protocol does not take into consideration the above multi packet reception technology. EPC global Class 1 Generation 2 standard which is extensively used in a current RFID system is a single antenna based protocol. In addition, since it is regarded that only one tag may be successfully identified in one slot, it is regarded that the estimated number of tags successfully identified is less than a real number of successfully identified tags so that an optimal frame size cannot be determined.

In the anti-collision protocol, the reader replies an acknowledge (ACK) to the tags which are successfully identified in the slot. Since the existing anti-collision protocol regards that a tag is successfully identified only when only one tag transmits the RN16 and unique identifier in one slot, the ACK response of the reader is achieved for only a single tag. When a plurality of tags is successfully identified in one slot through the multi packet reception, the reader should transmit the ACK response to a plurality of tags. However, the existing anti-collision protocol recognizes the above case as collision so that the ACK response is not transmitted. Even if the ACK response is transmitted, since the ACK response may be transferred to only a single tag, thus other tags which are successfully identified in the same slot considers that the above tags are not identified. The RN16 and the unique identifier may be transmitted in a next frame when the ACK response is received.

SUMMARY OF THE INVENTION

The present invention provides a tag anti-collision method, a tag reader apparatus and system which may improve a throughput and a tag identification rate of RFID systems with multi-packet reception capability by determining an optimal frame size based on a collision recovery probability and improving an acknowledge (ACK) command response method with respect to a plurality of tags in the RFID systems.

In an aspect, an anti-collision method by a tag reader apparatus in an RFID system including a plurality of RFID tags is provided. The method includes changing a length of a collision recovery slot which successfully identifies a plurality of tags even though at least two tags simultaneously replied in one slot to cause collision so that data transmission of at least one identified tag is achieved.

The changing of the length of a collision recovery slot may include sequentially transmitting a plurality of ACK commands to the at least one identified tag so that the data transmission of at least one identified tag is sequentially achieved in the collision recovery slot.

A success slot to succeed data transmission of the tag, an idle slot where no tags reply, a collision slot where identification fails due to collision, and a collision recovery slot to succeed tag identification even though at least two tags simultaneously replied may have different lengths.

The length of the collision recovery slot may be greater than the length of other slots.

A maximum value of a time when a reader waits for a response from a tag in the idle slot may be calculated as a time required transmitting one bit of the response from the tag.

A frame size may be determined so that a system throughput $\eta$ is maximized by defining a ratio of a time required to identify the tag to an occupied time of a slot succeeding tag identification as the system throughput.

The method may further include: calculating a probability of a collision slot based on the number of idle slots and a size of a k-th frame; and estimating the number of tags attempting identification in the k-th (the k is an arbitrary natural number) frame by applying the calculated probability of the collision slot using a zero estimation algorithm.

The number of the tags attempting identification in the (k+1)-th frame may be calculated by subtracting the number of tags which are successfully identified in the k-th frame from the number of tags attempting identification in the k-th frame.

A size of the (k+1)-th frame may be calculated so that a system throughput indicating a ratio of an average of a slot time succeeding the tag identification to a time average of a unit slot is maximized.

A function of the system throughput may be $$\eta(L_{k+1}) = \frac{\widetilde{P_{s,k+1}} D_s + E[D_{CR}]}{\widetilde{P_{s,k+1}} D_s + \widetilde{P_{c,k+1}} D_c + \widetilde{P_{i,k+1}} D_i + E[D_{CR}]},$$

where, the $\widetilde{P_{s,k+1}}$ represents a probability of the success slot in the (k+1)-th frame, the $\widetilde{P_{i,k+1}}$ represents a probability of the idle slot in the (k+1)-th frame, the $\widetilde{P_{c,k+1}}$ represents a probability of the collision slot in the (k+1)-th frame, the $E[D_{CR}]$ represents an average time of a collision recovery slot, the $D_s$ represents a time of the success slot, the $D_i$ represents a time of the idle slot, and the $D_c$ represents a time of the collision slot.

A size of the (k+1)-th frame may be calculated to make a partial differential function of the system throughput zero, and an integer form is calculated through a ceiling operator when the frame size is a real number.

In another aspect, an RFID tag reader apparatus in an RFID system including a plurality of RFID tags is provided. The RFID tag reader apparatus changes a length of a collision recovery slot which successfully identifies a plurality of tags even though at least two tags simultaneously replied in one slot to cause collision so that data transmission of at least one identified tag is achieved.

A plurality of ACK commands may be sequentially transmitted to the at least one identified tag so that the data transmission of at least one identified tag is sequentially achieved in the collision recovery slot.

The RFID apparatus may include: a receiver configured to receive a tag response and data from the tag; a transmitter configured to transmit a Query response command and an ACK command to the tag; and a controller configured to generate the Query response command by determining a length of a slot, to generate a Query command by determining a frame size, and to generate the ACK command based on a response from the tag.

A success slot to succeed data transmission of the tag, an idle slot where no tags reply, a collision slot where identification fails due to generation of collision, and a collision recovery slot to succeed tag identification even though at least two tags simultaneously replied may have different lengths.

The length of the collision recovery slot may be greater than the length of other slots.

A maximum value of a time waiting for a response from a tag in the idle slot may be calculated as a time required transmitting one bit of the response from the tag.

A frame size may be determined so that a system throughput $\eta$ is maximized by defining a ratio of a time required to identify the tag to an occupied time of a slot succeeding tag identification as the system throughput.

In a further aspect, an RFID system is provided. The RFID system includes an RFID reader apparatus configured to change a length of a collision recovery slot in the collision recovery slot which successfully identifies a plurality of tags even though at least two tags simultaneously replied in one slot to cause collision so that data transmission of at least one identified tag is achieved; and a plurality of RFID tags configured to transmit a unique identifier of a tag in response to a Query response command from the RFID reader, and to transmit data in response to an ACK command to the RFID reader.

In accordance with the tag anti-collision method, a tag reader apparatus and system for RFID systems with multi-packet reception capability according to the present invention, a tag identification rate of the RFID system can be improved and an identification time of the RFID system can be reduced by using a method of determining a frame size taking into consideration multi packet reception in the RFID system and an ACK response method with respect to a plurality of tags in a single slot.

DESCRIPTION OF EXEMPLARY EMBODIMENTS

Figure 1:
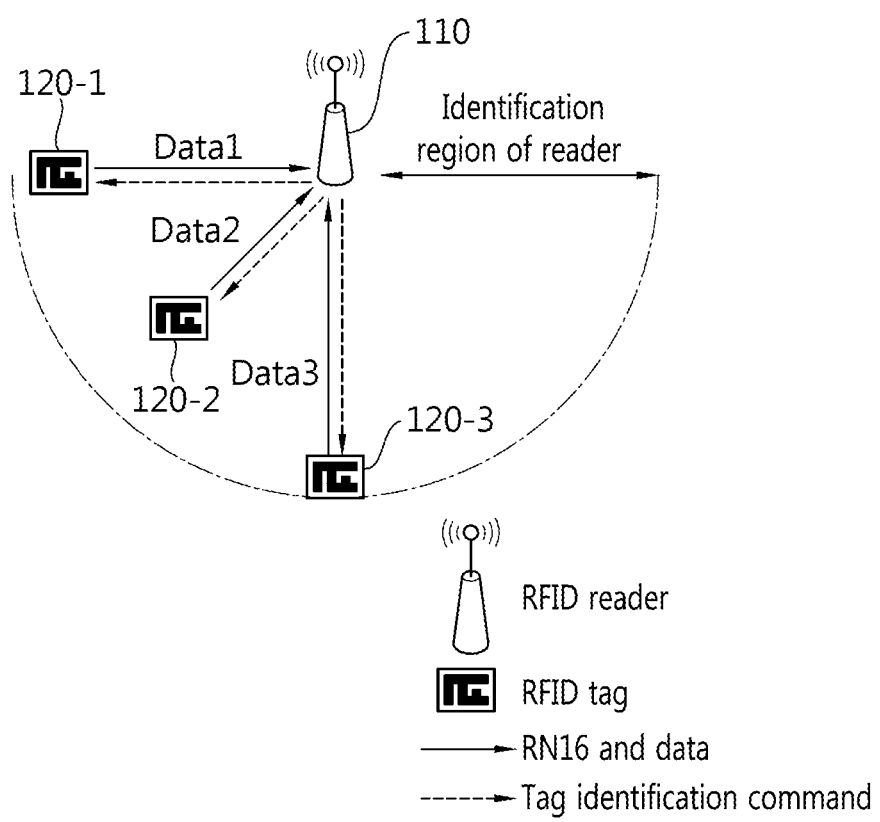
FIG. 1 is a diagram schematically illustrating a situation of identifying tags from an identification region in an RFID system by a reader.

Rather, these example embodiments are provided so that this disclosure will be thorough and complete, and will fully convey the scope of the present inventive concept to those skilled in the art.

However, the embodiment is not limited to the specific embodiment, but the embodiment includes all modifications, equivalents, and substitutes belonging to the technical scope of the embodiment without departing from the spirit of the embodiment.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

In addition, when a component is referred to as being "connected to" or "linked to" another component, the component may be directly connected to or linked to another component or an intervening component may be present therebetween. In contrast, if a component is referred to as being "directly connected to" or "directly linked to" another component, an intervening component may not be present therebetween.

The terms used in the specification are for the purpose of explaining specific embodiments and have no intention to limit the disclosure. Unless the context indicates otherwise, the singular expression may include the plural expression. In the following description, the term "include" or "has" will be used to refer to the feature, the number, the step, the operation, the component, the part or the combination thereof without excluding the presence or addition of one or more features, the numbers, the steps, the operations, the components, the parts or the combinations thereof.

Unless defined otherwise, the terms including technical and scientific terms used in this specification may have the meaning that can be commonly apprehended by those skilled in the art. The terms, such as the terms defined in the commonly-used dictionary, must be interpreted based on the context of the related technology and must not be interpreted ideally or excessively.

Hereinafter, exemplary embodiments will be described in more detail with reference to accompanying drawings. In the following description, for the illustrative purpose, the same components will be assigned with the same reference numerals, and the repetition in the description about the same components will be omitted in order to avoid redundancy.

Summary of RFID System

FIG. 1 is a diagram schematically illustrating a situation of identifying tags from an identification region of an RFID system by a reader.

Referring to FIG. 1, the RFID system may include one reader 110 and a plurality of tags 120-1 to 120-3. The plurality of tags 120-1 to 120-3 may be located in an identification region of the reader 110. The reader 110 may broadcast a tag identification command. If the tags 120-1 to 120-3 receive the tag identification command, the tags 120-1 to 120-3 may transmit an RN16 and data thereof to the reader 100 in a backscattering scheme.

In particular, according to an embodiment of the present invention, a time may be divided into frames and each frame may include a plurality of slots in an RFID system of a DFSA based environment. A size of the frame may be defined by the number of slots configuring one frame. A tag identification procedure is described. If the reader 110 transmits a Query command including frame size information to the tags 120-1 to 120-3, tags which are not identified yet by the reader select an arbitrary slot from the frame. In this case, when each of the tags 120-1 to 120-3 receives a Query response command (hereinafter referred to as 'QR command') of the reader in a slot start point while memorizing a value corresponding to a slot selected by each tag as a slot counter variable, each tag reduces a slot counter value thereof in a unit of 1. When the slot counter value becomes 0, the tag 120-1 transmits an RN16 thereof in a corresponding slot. In this case, if the reader 110 successfully receives the RN16, the reader 110 transmits an acknowledge (ACK) command including the RN16 as a factor to the tags 120-1 to 120-3. Only a tag transmitting a corresponding RN16 among the tags 120-1 to 120-3 receiving the ACK command may transmit data of the tag to the reader 110. The reader 110 retransmits the QR command to the tags 120-1 to 120-3 for the purpose of starting a next slot. The tags 120-1 to 120-3 may repeat the above procedure while updating a slot counter value of the tags.

Types of Slots

Figure 2:
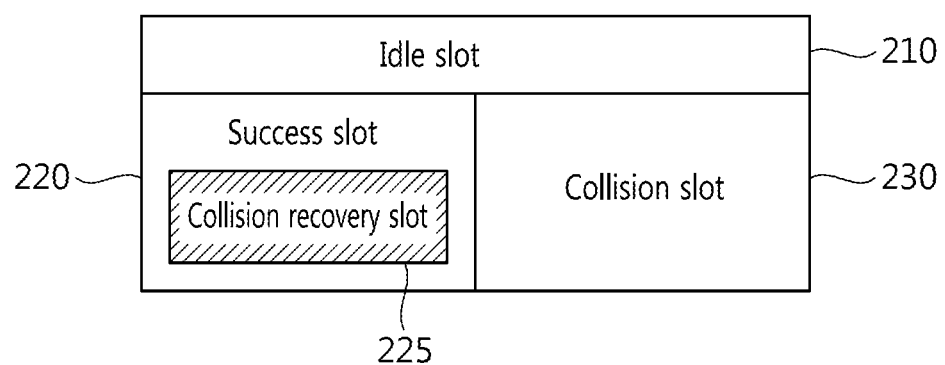
FIG. 2 is a Venn diagram illustrating possible states of a slot after ID response of tags.

FIG. 2 is a Venn diagram illustrating possible states of a slot after ID response of tags.

Referring to FIG. 2, a slot in the RFID system may have four states in a multi packet reception environment. The states of the slot includes an idle slot 210 where no tags reply, a success slot 220 where only one tag replies to succeed data transmission of the tag, and a collision slot 230 where identification fails due to collision. Further, the success slot 220 may include a collision recovery slot 225 which successfully identify at least one tag when at least two tags simultaneously reply.

Concept of Tag Anti-Collision Method

Figure 3:
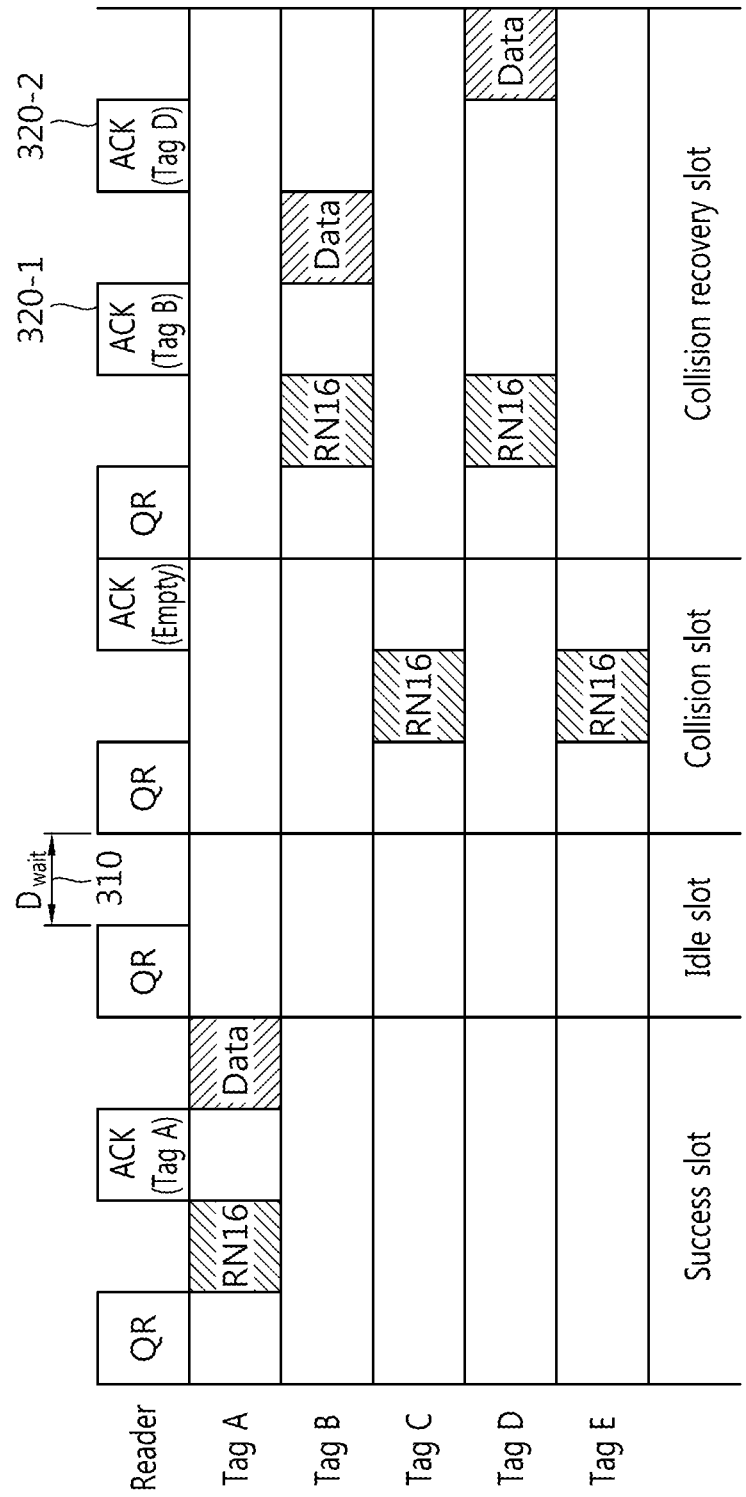
FIG. 3 is a diagram illustrating an overall operation of a tag anti-collision method according to an embodiment of the present invention.

FIG. 3 is a diagram illustrating an overall operation of a tag anti-collision method according to an embodiment of the present invention.

Referring to FIG. 3, tag identification procedures in each slot state are differently performed, respectively. Tags A, B, C, D, and E arbitrary select slots to which the tag will transmit data, respectively. In this case, the tag A, the tags C and D, and tags B and D select 1, 3, and 4 to transmit the data to a first slot, a third slot, and a fourth slot, respectively.

Accordingly, the first slot is a success slot where only the tag A transmits the data. If the tags A, B, C, D, and E receive the QR command from the reader, the tags reduce a slot counter value thereof in the unit of 1, respectively. As a result, only the tag A may have a slot counter value of 0 to transmit the RN 16 in a corresponding slot. The reader allows the tag A to confirm successfully receiving RN16 of the tag A through ACK response. In this case, the tag A may confirm that RN16 included in a corresponding ACK is the same as the RN16 transmitted from the tag A to transmit data thereof. Since remaining tags do not transmit the RN16 in a corresponding slot, the remaining tags do not reply to an ACK of the reader. Since the tag A is successfully identified in a first slot by the reader, the tag A does not reply to a QR command from the reader in another slot afterward.

The second slot of FIG. 3 is an idle slot. If the tags B, C, D, and E receive the QR command from the reader, the tags reduces slot counter values thereof in a unit of 1, respectively. As a result, the tags C and E may have a slot counter value of 1, and the tags B and D may have a slot counter value of 2. That is, there are no tags having the slot counter value of 0. The reader waits RN16 of tags for a $D_{wait}$ time 310 after transmitting the QR command and terminates a corresponding slot since the reader does not receive the response. The $D_{wait}$ time 310 is a time without transmission/reception of data. When the reader waits for a very long $D_{wait}$ time 310, the efficiency of the entire system is deteriorated. Accordingly, the $D_{wait}$ time 310 may be adjusted based on a bit transmission rate used for transmitting the RN16 and the data. For example, a transmission delay time required to transmit one bit configuring the RN16 is calculated as an inverse of a bit transmission rate, and may be set as the $D_{wait}$ time 310. This is expressed by a following equation 1.

$$D_{wait} = \frac{1}{b} \qquad \text{[Equation 1]}$$

where, the $D_{wait}$ represents transmission delay required to transmit one bit configuring the RN16, and the b represents a bit transmission rate used to transmit the RN16 and the data.

The third slot of FIG. 3 is a collision slot. If the tags B, C, D, and E receive the QR command from the reader, the tags reduce slot counter values thereof in the unit of 1 once again, respectively. As a result, the tags C and E have a slot counter value of 0 and transmit the RN16 to the reader, respectively. The reader may fail in the multi packet reception not to recognize both of two RN16 values. In this case, the reader adds an empty RN16 value to the ACK response to report the collision slot to the tags and to terminate a corresponding slot. If the tags C and E transmit the RN16 in a corresponding slot but are not identified due to collision, the tags C and E again select an arbitrary slot from a next frame to have an opportunity to transmit the RN16 and the data. Before the next frame starts, the tags C and E do not replay to the QR command from the reader.

The fourth slot of FIG. 3 is a collision recovery slot. If the tags B and D receive the QR command from the reader, the tags B and D reduce slot counter values thereof in the unit of 1, respectively. As a result, the tags B and D have slot counter values of 0 and transmit RN16 to the reader, respectively. The reader succeeds the multi packet reception to successfully identify the RN16 of the tag B from two RN16 values and transmits an ACK response 320-1 including a corresponding RN16 value to the tag B. If the tag B receives the ACK response 320-1, the tag B may confirm that RN16 thereof is the same as the RN16 included in the ACK response 320-1 to transmit data thereof to the reader. In this case, since the RN16 of the tag D is not the same as the RN16 included in the ACK response 320-1, the tag D waits. After the reader successfully receives the data of the tag B, the reader transmits the ACK response 320-2 including the RN16 value of the tag D. If the tag D receives the ACK response 320-2, the tag D may confirm that the RN16 thereof is the same as the RN16 included in the ACK response 320-2 to transmit the data of the tag D to the reader. Accordingly, a collision recovery slot is terminated.

As illustrated in FIG. 3, a length of a success slot, a length of a collision slot, a length of an idle slot, and a length of a collision recovery slot are different from each other. If only one tag transmits the RN16 to the reader as a response like the first slot, the reader successfully identifies a corresponding tag so that the success slot is obtained. If the reader successfully receives data of the tag in the success slot, the reader immediately transmits the QR command to start a next slot. When no tags transmit the RN16 to the reader for a predetermined time like the second slot, the corresponding slot becomes the idle slot. In this case, when there is no RN16 received from a maximum $D_{wait}$ time 310, the reader transmits the QR command to start a next slot. When at least two tags simultaneously transmit the RN16 to the reader, if the tag fails in the multi packet reception, the corresponding slot becomes the collision slot like the third slot. In this case, directly after transmitting the ACK response reporting that a corresponding slot is the collision slot to the tag, the reader transmits the QR command to start the next slot. If the reader succeeds the multi packet reception to individually and successfully identify collided RN16 like the fourth slot, the reader may continuously transmit ACK commands 320-1 and 320-2 to identify the collided tags, respectively. According to the related art, the reader may transmit only one ACK command in one slot. However, according to an embodiment of the present invention, the reader may transmit the ACK commands 320-1 and 320-2 for a plurality of tags. Accordingly, the slot length may be adjusted greater than other slots for data transmission/reception. That is, the reader sequentially transmits the ACK commands 320-1 and 320-2 to all tags which are successfully identified in a collision recovery slot. The reader transmits the QR command indicating the start of the next slot for the first time after a procedure of acquiring data from a corresponding tag is terminated.

Configuration of Tag Identification Apparatus

Figure 4:
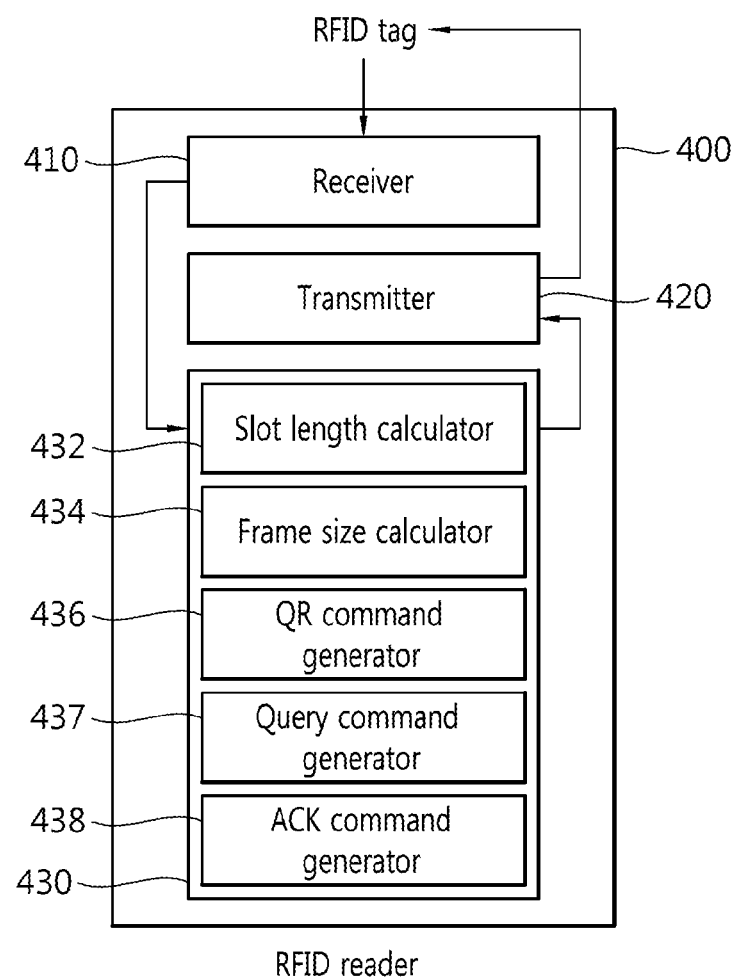
FIG. 4 is a block diagram schematically illustrating an RFID reader apparatus according to an embodiment of the present invention.

FIG. 4 is a block diagram schematically illustrating an RFID reader apparatus according to an embodiment of the present invention. As shown in FIG. 4, an RFID reader apparatus 400 according to an embodiment of the present invention may include a receiver 410, a transmitter 420, and a controller 430.

Referring to FIG. 4, the receiver 410 may receive an RN16 response and data from a plurality of RFID tags. The receiver 410 may transmit the received RN16 response and data to the controller 430.

The transmitter 420 receives a Query command, a QR command, and an ACK command from the controller 430 to transmit the received Query command, QR command, and ACK command to a corresponding tag.

The receiver 410 and the transmitter 420 are a wireless communicable constituent element including an antenna. The receiver 410 and the transmitter 420 may be integrally configured as a communication unit (not shown).

The controller 430 receives and parses an RN16 response of a tag in response to the QR command from the receiver 410 to determine presence of collision and to identify tags. The controller 430 may generates an ACK command based on presence of identification success to transmit the generated ACK command to the transmitter 420. The controller 430 may receive data from a corresponding tag through the receiver 410 as a response to the ACK command. Further, the controller 430 may changeably determine the length of the slot according to the type of the slot and may accordingly calculate an optimal frame size.

According to an embodiment of the present invention, the controller 430 may include a slot length calculator 432, a frame size calculator 434, a QR command generator 436, a Query command generator 437, and an ACK command generator 438. The controller 430 may be configured by a hardware processor. Respective constituent elements 432, 434, 436, 437 and 438 may be configured by different processors or one processor.

The slot length calculator 432 may calculate lengths of a success slot, an idle slot, a collision slot, and a collision recovery slot. In this case, the length of an idle slot may be calculated by summing an occupied time of the QR command and the above $D_{wait}$ time. The $D_{wait}$ time may be calculated through the equation 1 using the RN16. A method of calculating a slot length by the slot length calculator 432 is described through following equations 2 to 5.

The QR command generator 436 generates a QR command reporting start and an end of the slot to tags based on the slot length calculated from the slot length calculator 432.

The frame size calculator 434 calculates a size of a frame based on the length of the slot calculated from the slot length calculator 432. The size of the frame may be changed according to a generation probability of each slot, a length of a corresponding slot, and the number of tags attempting identification. In this case, the frame size calculator 434 may define the ratio of a time required to identify the tags to an occupied time of a slot succeeding tag identification as a system throughput to determine a frame size so that the system throughput is maximized A method of determining the frame size by calculating the system throughput based on the calculated slot length will be described through following equations 6 to 21 below.

The Query command generator 436 generates a QR command based on the frame size calculated from the frame size calculator 434. The tags may select slots to which data are transmitted to set slot counters based on the frame size included in the QR command, respectively.

The ACK command generator 438 parses the received RN16 response to generate the ACK command. When it is impossible to identify the RN16 from responses of the tags, the ACK command generator 438 may recognize collision to generate an ACK response including an empty RN16. When one or more RN16 values may be identified from the responses of the tags, the ACK command generator 438 generates the ACK response including one of RN16 values which are successfully identified. Further, the ACK command generator 438 may receive data to generate the ACK command including one of RN16 values which are successfully identified. That is, a plurality of data may be received in one collision recovery slot. In this case, the ACK command generator 438 may sequentially generate the ACK command to transmit the generated ACK command individually to a corresponding tag.

Operation of Tag Anti-Collision Method

Figure 5:
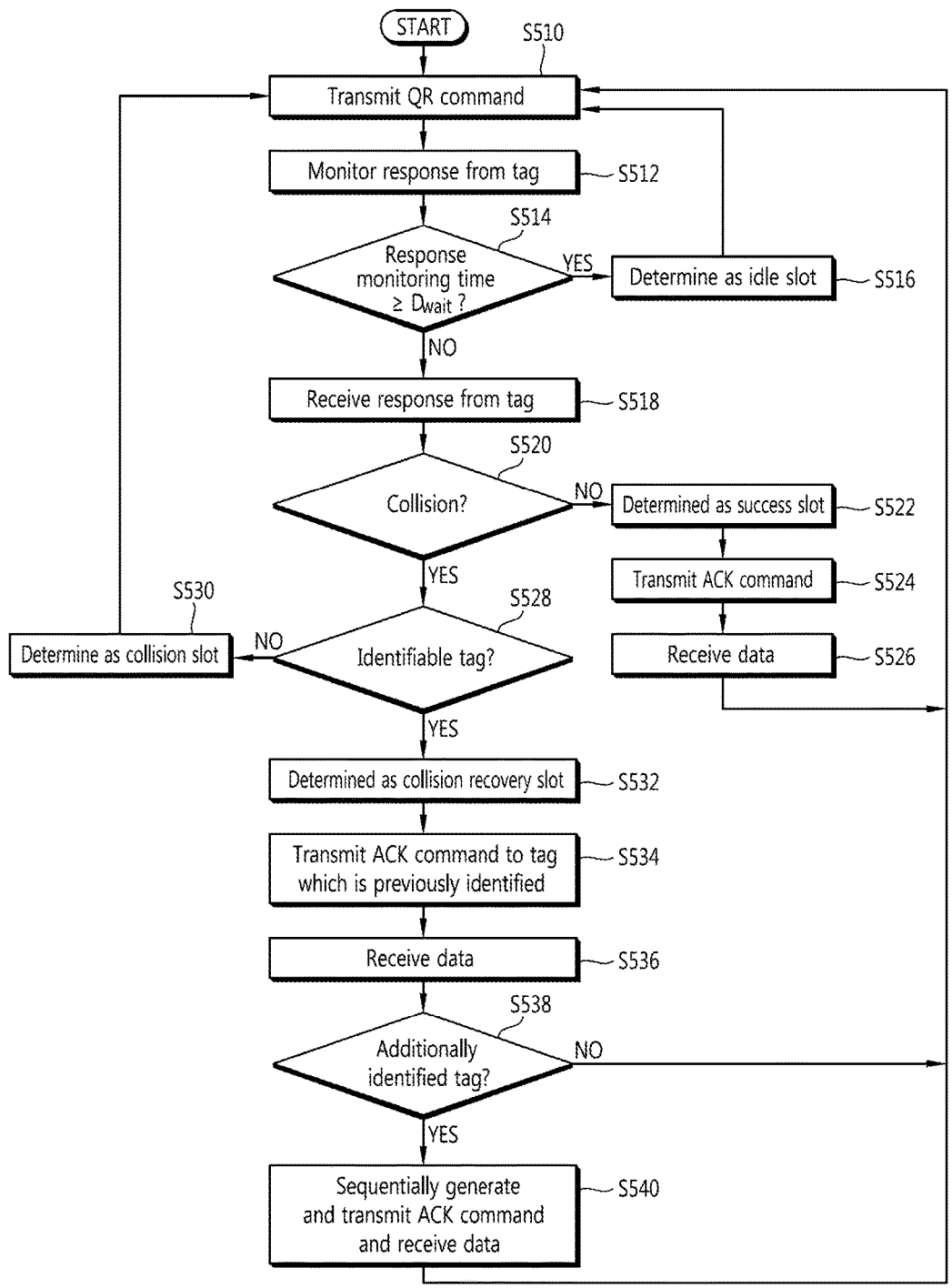
FIG. 5 is a flowchart schematically illustrating a tag anti-collision method according to an embodiment of the present invention.

FIG. 5 is a flowchart schematically illustrating a tag anti-collision method according to an embodiment of the present invention.

Referring to FIG. 5, the RFID reader 400 transmits the QR command (S510). After transmitting the QR command, the RFID reader monitors responses from the tags (S512). In this case, the RFID reader 400 determines whether a response monitoring time (time without the response from the tag) exceeds a predetermined time, for example, the above $D_{wait}$ time (S514). If there is no response from the tag for the $D_{wait}$ time, the RFID reader 400 determines that a corresponding slot is an idle slot (S516), and transmits the QR command in order to report start of a next slot (S510).

If there is the response from the tag before the $D_{wait}$ time elapses, the RFID reader receives the response from the tag (S518). The RFID reader determines whether collision is caused due to a plurality of tag responses (S520). When the collision is not caused, that is, when response from one tag is received, the RFID reader 400 may determine that a corresponding slot is a success slot (S522). Further, the RFID reader generates an ACK command including an RN16 value included in the tag response to transmit the generated ACK command to a corresponding tag (S524). If the tag receives the ACK command, the tag confirms whether the ACK command is the same as an RN16 value of the tag to transmit data. The RFID reader 400 receives data from the tag to terminate the corresponding slot (S526). Next, the RFID reader 400 may transmit the QR command in order to report start of a next slot (S510).

If the collision is caused because there are a plurality of tag responses in step S520, the RFID reader 400 determines whether there is an identifiable tag during the collided tag response (S528). If there is no identifiable tag, the RFID reader determines that a corresponding slot is the collision slot (S530), and terminates the slot by transmitting the ACK command including an empty RN16 value and goes to a next slot (S510).

If there is the identifiable tag during the collided tag response, the RFID reader 400 determines that the corresponding slot is the collision recovery slot (S532). The RFID reader 400 may succeed the multi packet reception to transmit the ACK command to a tag which is identified first (S534). In addition, the RFID reader 400 may receive data from the corresponding tag (S536). If the reception of the data (S536) is terminated, the RFID reader 400 determines whether there is an additionally identified tag (S538). If there is no additionally identified tag, the RFID reader 400 terminates a slot and goes to a next slot (S510). If there is the additionally identified tag, the RFID reader sequentially generates and transmits the ACK command and receives data from the tag (S540). As described above, if tag identification, ACK transmission, and a data reception procedure in response to ACK are terminated in a corresponding slot, the RFID reader may go to a next slot (S510).

Method of Determining Frame Size

Unlike the related art, according to an embodiment of the present invention, a length of a success slot, a length of an idle slot, a length of a collision slot, and a length of a collision recovery slot may be different from each other. A tag identification time may be minimized by reducing a time required due to the collision slot and the idle slot. In this case, a system throughput considering a variable slot length may be defined as a ratio of an average length of slots (a success slot and a collision recovery slot) succeeding tag identification to an average length of a unit slot. According to an embodiment of the present invention, the frame size may be determined to maximize the system throughput.

First, a time $D_s$ of the success slot, a time $D_i$ of the idle slot, a time $D_{CR,j}$ of the collision recovery slot, and a time $D_c$ of the collision slot may be expressed by following equations 2 to 5. First, the time $D_s$ of the success slot may be expressed as a sum of a time $D_{QR}$ transmitting the QR command to the tag by the reader, a time $D_{RN16}$ transmitting the RN16 to the reader by the tag, a time $D_{ACK}$ transmitting the ACK response to the tag by the reader, and a time $D_{Data}$ required to transmit data to the reader by the tag, which may be expressed by a following equation 2.

$$D_s = D_{QR} + D_{RN16} + D_{ACK} + D_{Data} \qquad \text{[Equation 2]}$$

The time $D_C$ of the collision slot where the reader cannot identify tags may be expressed by a sum of a time $D_{QR}$ transmitting the QR command to the tag by the reader, a time $D_{RN16}$ transmitting the RN16 to the reader by the tag, and a time $D_{ACK}$ transmitting the ACK response to the tag by the reader, which may be expressed by a following equation 3.

$$D_C = D_{QR} + D_{RN16} + D_{ACK} \qquad \text{[Equation 3]}$$

Next, the time $D_i$ of the idle slot may be expressed by a sum of a time $D_{QR}$ transmitting a QR command to a tag by the reader and a maximum value $D_{wait}$ of a time waiting for a RN16 response in a corresponding slot by the reader, which may be expressed by a following equation 4.

$$D_i = D_{QR} + D_{wait} \quad \text{[Equation 4]}$$

In this, the $D_{wait}$ is a time required to transmit 1 bit of the RN16 from the tag, which may be defined by the above equation 1.

Finally, a time $D_{CR,j}$ of the collision recovery slot where j tags are successfully identified is calculated by summing a time $D_s$ of the success slot including an operation of successfully transmitting data by a single tag and a time required to receive an ACK of the reader and to transmit the data by remaining (j−1) tags.

$$D_{CR,j} = D_s + (j-1)(D_{ACK} + D_{Data}) \quad \text{[Equation 5]}$$

A probability of the success slot, a probability of the idle slot, a probability of the collision recovery slot, and a probability of the collision slot in the k-th frame is defined by following equations 6 to 10. $N_k$ tags to be identified in the k-th frame exist. In this case, it is assumed that the frame size is $L_k$. In this case, a probability $P_k(i)$ where i tags reply in a specific slot may be expressed by a following equation 6 according to a binomial distribution ($0 \le i \le N_k$).

$$P_k(i) = \binom{N_k}{i}\left(\frac{1}{L_k}\right)^i\left(1-\frac{1}{L_k}\right)^{N_k-i} \quad \text{[Equation 6]}$$

The $P_{s,k}$ represents a probability of the success slot in the k-th frame, which is a probability where only of the $N_k$ tags replies in one slot, and is defined using the binomial distribution. Moreover, the $P_{i,k}$ is a probability of an idle slot in the k-th frame, and a probability that the number of tags which reply in a slot is 0, and is defined using the binomial distribution.

A probability $P_{s,k}$ of the success slot and a probability $P_{i,k}$ of the idle slot represent cases where the number of replying tags is 1 and 0 in the above equation 6, which may be expressed by following equations 7 and 8, respectively.

$$P_{s,k} = P_k(1) = N_k\left(\frac{1}{L_k}\right)\left(1-\frac{1}{L_k}\right)^{N_k-1} \quad \text{[Equation 7]}$$

$$P_{i,k} = P_k(0) = \left(1-\frac{1}{L_k}\right)^{N_k} \quad \text{[Equation 8]}$$

Next, a probability $P_{CR,k}$ of the collision recovery slot may be expressed by a following equation 9 using a probability $P_d(i,j)$ (see FIG. 6 and table 1) where j tags are successfully identified where the number i of the tags is at least two.

$$P_{CR,k} = \sum_{i=2}^{N_k} P_k(i) \cdot \sum_{j=1}^{i} P_d(i,j) \quad \text{[Equation 9]}$$

Figure 6:
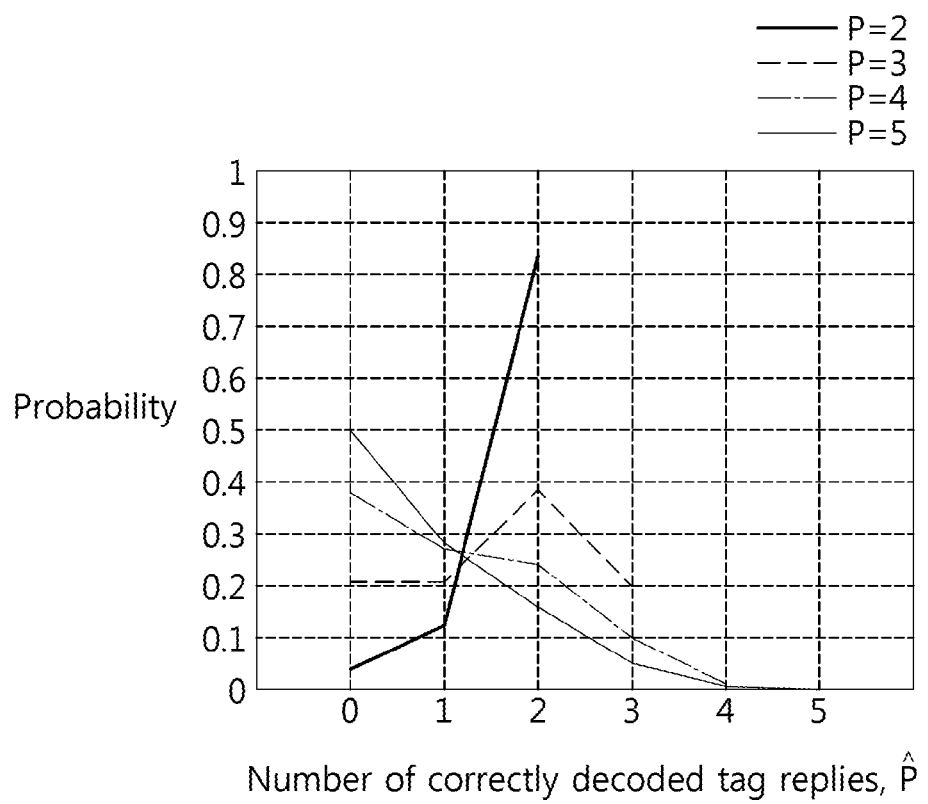
FIG. 6 is a graph illustrating a probability in which a reader successfully identifies $\hat{P}$ tags when P tags simultaneously reply in one slot.

FIG. 6 is a graph illustrating a probability in which a reader successfully identifies $\hat{P}$ tags when P tags simultaneously reply in one slot. A following table represents the probabilities that j tags can be identified successfully in the reader when i tags replied in a slot simultaneously.

TABLE 1

| $P_d(i,j)$ | Values |
|---|---|
| $P_d(2, 0)$ | 0.0416 |
| $P_d(2, 1)$ | 0.125 |
| $P_d(2, 2)$ | 0.8334 |
| $P_d(3, 0)$ | 0.2083 |
| $P_d(3, 1)$ | 0.2083 |
| $P_d(3, 2)$ | 0.3751 |
| $P_d(3, 3)$ | 0.2083 |
| $P_d(4, 0)$ | 0.383 |
| $P_d(4, 1)$ | 0.2747 |
| $P_d(4, 2)$ | 0.234 |
| $P_d(4, 3)$ | 0.1 |
| $P_d(4, 4)$ | 0.0083 |
| $P_d(5, 0)$ | 0.5 |
| $P_d(5, 1)$ | 0.2913 |
| $P_d(5, 2)$ | 0.1584 |
| $P_d(5, 3)$ | 0.04505 |
| $P_d(5, 4)$ | 0.00415 |
| $P_d(5, 5)$ | 0.0011 |

When $2 \le i \le 5$ in the table 1 and FIG. 6, a $P_d(i,j)$ is calculated using FIG. 6 and a following table 1. When i>5, the $P_d(i,j)$ becomes 0.

Finally, a probability $P_{c,k}$ of the collision slot may be expressed by a following equation 10 by subtracting a probability of the success slot, the idle slot, and the collision recovery slot from a total probability.

$$P_{c,k} = 1 - P_{s,k} - P_{i,k} - P_{CR,k} \quad \text{[Equation 10]}$$

Since the RFID reader 400 cannot exactly know the number $N_k$ of tags attempting to be identified in the k-th frame, it may be difficult to calculate the probability of the idle slot by the method of the above equation 8. Accordingly, instead of this, the reader may calculate a probability $\widetilde{P_{i,k}}$ of the collision slot through the number $c_{0,k}$ of idle slots and the size $L_k$ of the k-th frame in the k-th frame as a following equation 11.

$$\widetilde{P_{i,k}} = \frac{c_{0,k}}{L_k} \quad \text{[Equation 11]}$$

The number $\hat{N}_k$ of tags attempting to be identified in the k-th frame may be estimated using the following equation 12 by applying the equation 11 to a zero estimation algorithm.

$$\hat{N}_k = \frac{\log_{10}(\widetilde{P_{i,k}})}{\log_{10}(L_k - 1/L_k)} \quad \text{[Equation 12]}$$

$\widetilde{N_{k+1}}$ represents the number of tags attempting to be identified in a (k+1)-th frame. The $\widetilde{N_{k+1}}$ may be estimated in a method of subtracting the number $$c_{1,k} + \sum_{j=2}^{j^*} jc_{r,k}(j)$$

of tags which are successfully identified in the k-th frame from the number $\hat{N}_k$ of tags attempting to be identified in the k-th frame as the following equation 13. The $c_{1,k}$ represents a value measuring the number of slots at which the reader successfully identifies one tag in the k-th frame. The $c_{r,k}(j)$ represents a value measuring the number of slots at which the reader successfully identifies j tags through multi packet reception in the k-th frame. The j* represents the maximum number of tags which may be identified and recognized through successive interference cancellation in one slot.

$$\widehat{N_{k+1}} = \hat{N}_k - \left( c_{1,k} + \sum_{j=2}^{j^*} j c_{r,k}(j) \right) \quad \text{[Equation 13]}$$

If the number $\widehat{N_{k+1}}$ of tags attempting to be identified in the (k+1)-th frame obtained from the equation 13 is applied to the above equations 6 to 10, a probability $\widehat{P_{s,k+1}}$ of the success slot, a probability $\widehat{P_{i,k+1}}$ of the idle slot, a probability $\widehat{P_{CR,k+1}}$ of the collision recovery slot, and a probability $\widehat{P_{c,k+1}}$ of the collision slot in the (k+1)-th frame may be calculated using following equations 14 to 18, respectively.

$$\widehat{P_{k+1}}(i) = \binom{\widehat{N_{k+1}}}{i} \left( \frac{1}{L_{k+1}} \right)^i \left( 1 - \frac{1}{L_{k+1}} \right)^{\widehat{N_{k+1}} - i} \quad \text{[Equation 14]}$$

A size of the (k+1)-th frame is $L_{k+1}$. When it is estimated that $\widehat{N_{k+1}}$ tags attempt to be identified, if each tag selects an arbitrary slot to reply, a replying probability $\widehat{P_{k+1}}(i)$ of i tags in one slot may be calculated using a binomial distribution.

$$\widehat{P_{s,k+1}} = \widehat{P_{k+1}}(1) = \widehat{N_{k+1}} \left( \frac{1}{L_{k+1}} \right) \left( 1 - \frac{1}{L_{k+1}} \right)^{\widehat{N_{k+1}} - 1} \quad \text{[Equation 15]}$$

A probability $\widehat{P_{s,k+1}}$ of the success slot in the (k+1)-th frame is a probability where only one of $\widehat{N_{k+1}}$ tags replies in on slot, and is defined using a binomial distribution.

$$\widehat{P_{i,k+1}} = \widehat{P_{k+1}}(0) = \left( 1 - \frac{1}{L_{k+1}} \right)^{\widehat{N_{k+1}}} \quad \text{[Equation 16]}$$

A probability $\widehat{P_{i,k+1}}$ of the idle slot in the (k+1)-th frame is a probability having the zero replying tags and is defined using a binomial distribution.

$$\widehat{P_{CR,k+1}} = \sum_{i=2}^{\widehat{N_{k+1}}} \widehat{P_{k+1}}(i) \times \sum_{j=1}^{i} P_d(i,j) \quad \text{[Equation 17]}$$

In this case, the $\widehat{P_{CR,k+1}}$ represents a probability of the collision recovery slot in the (k+1)-th frame. The $\widehat{P_{k+1}}(i)$ represents a replying probability of i tags in an arbitrary slot in the (k+1)-th (see Equation 14). The $P_d(i,j)$ represents probability of successful identification (FIG. 6 and the table 1) of j tags (1≤j≤i) among i tags which collide in one slot. In this case, when 2≤i≤5, the $P_d(i,j)$ is calculated using FIG. 6 and the table 2. When i>5, the $P_d(i,j)$ is 0.

$$\widehat{P_{c,k+1}} = 1 - \widehat{P_{s,k+1}} - \widehat{P_{i,k+1}} - \widehat{P_{CR,k+1}} \quad \text{[Equation 18]}$$

A probability $\widehat{P_{c,k+1}}$ of the collision slot in (k+1)-th frame is calculated by subtracting a probability of the success slot, the collision recovery slot, and the idle slot from a total probability.

As describe above, if a probability of each slot is calculated in the (k+1)-th frame, a system throughput considering a variable slot length may be calculated. As described above, the system throughput may be defined as a ratio of a slot (success slot and collision recovery slot) time succeeding tag identification to a time average of a unit slot. This may be calculated using a following equation 19.

$$\eta(L_{k+1}) = \frac{\widehat{P_{s,k+1}} D_s + E[D_{CR}]}{\widehat{P_{s,k+1}} D_s + \widehat{P_{c,k+1}} D_c + \widehat{P_{i,k+1}} D_i + E[D_{CR}]} \quad \text{[Equation 19]}$$

In this case, the $\eta(L_{k+1})$ represents a system throughput when the frame size is $L_{k+1}$. The $E[D_{CR}]$ represents an average time of the collision recovery slot.

The $E[D_{CR}]$ represents an average length of the collision recovery slot. The $E[D_{CR}]$ is expressed using a probability $P_k(i)$ with respect to the number of tags replying in one slot, the collision recovery probability $P_d(i,j)$, and a time $D_{CR,j}$ of a collision recovery slot where j tags are successfully identified, which may be expressed by a following equation 20.

$$E[D_{CR}] = \sum_{i=2}^{\widehat{N_{k+1}}} \widehat{P_{k+1}}(i) \times \sum_{j=1}^{i} P_d(i,j) \times D_{CR,j} \quad \text{[Equation 20]}$$

When using the equations 2 to 5 and equations 12 to 18, the system throughput $\eta(L_{k+1})$ of the equation 19 may be expressed as an equation regarding a size $L_{k+1}$ of the (k+1)-th frame.

According to an embodiment of the present invention, since the method of determining the frame size determines to maximize the system throughput, the above method may be replaced with a method of solving an optimization problem defined in a following equation 21.

$$\widehat{L_{opt,k+1}} = \underset{L_{k+1}}{\arg\max}(\eta(L_{k+1})) \quad \text{[Equation 21]}$$

In this case, the $\widehat{L_{opt,k+1}}$ represents an optimal size of the (k+1)-th frame. As an example of solving the above, the size $L_{k+1}$ of the (k+1)-th frame is calculated to make a partial differential function of the system throughput zero. The $\widehat{L_{opt,k+1}}$ of an integer form may be obtained through a ceiling operator as compared with a case where the frame size is a real number. The above is expressed by a following equation 22.

$$\frac{\partial \eta(L_{k+1})}{\partial L_{k+1}} = 0 \quad \text{[Equation 22]}$$

$$L_{opt,k+1} = \lceil L_{k+1} \rceil$$

The RFID reader calculates the through the $\widetilde{L_{opt,k+1}}$ equation 21 to calculate an optimal size of the (k+1)-th frame, and may add the optimal size of the (k+1)-th frame to a Query command.

Simulation Result

Figure 7:
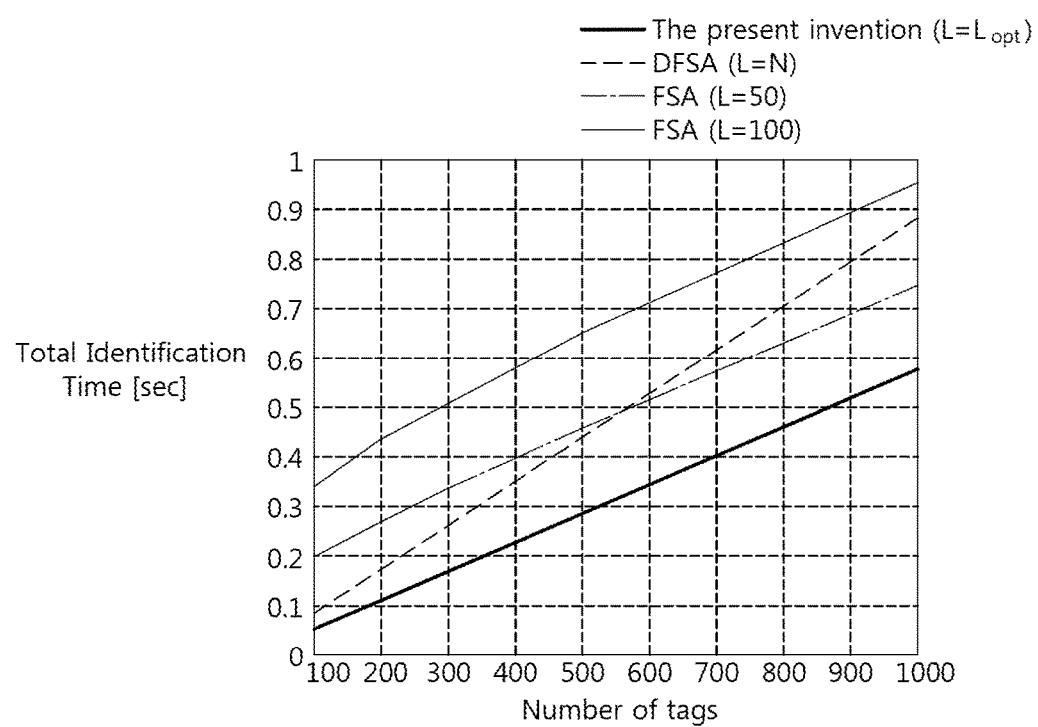
FIG. 7 is a graph comparing a tag identification time performance of a method according to the present invention with a tag identification time performance of a method according to the related art in an RFID system of a multi packet reception environment.

FIG. 7 is a graph comparing a tag identification time performance of a method according to the present invention with a tag identification time performance of a method according to the related art in an RFID system of a multi packet reception environment. The performance of the RFID system using the method of determining a frame size according to the present invention for maximizing a throughput in a multi packet reception environment is evaluated.

Simulation environment parameters are set as illustrated in a following table 2 according to an EPC global Class 1 Generation 2 standard.

TABLE 2

| Parameters | Values |
| --- | --- |
| QR command size | 4 bits |
| RN 16 size | 16 bits |
| ACK command size | 18 bits |
| Data size | 96 bits |
| Bit rate | 25 kbps |
| Frequency | 900 MHz |

The number of tags is increased in the range of 100 to 1000. Simulation of comparing a tag identification time according to an FSA and a DFSA of the related art with a tag identification time in the method of determining a frame according to the present invention is performed. Simulations with respect to the FSA in the frame sizes of 50 and 100 are performed, respectively.

Referring to FIG. 7, in both of the related art and the method according to the present invention, as the number of tags is increased, an identification time is smoothly increased. However, in a case of the DFSA according to the related art, as the number of tags is increased, the identification time is rapidly increased as compared with the present invention. Meanwhile, the method according to the present invention may identify all tags in 34.6% and 39.6% shorter than the DFSA according to the related art having the number of tags of 1000 and the FSA according to the related art having the number of tags of 100. That is, the method according to the present invention determines an optimal frame size capable of maximizing the system throughput by taking into consideration the multi packet reception technology. The method according to the present invention may reduce the identification time and the system throughput as compared with the related art using an anti-collision protocol capable of continuously sending the ACK response to tags which are successfully identified in one slot.

Although a preferred embodiment of the disclosure has been described for illustrative purposes, those skilled in the art will appreciate that various modifications, additions and substitutions are possible, without departing from the scope and spirit of the invention as disclosed in the accompanying claims.

What is claimed is:

1. An anti-collision method by a tag reader apparatus in an RFID system including a plurality of RFID tags, the method comprising:
   changing a length of a collision recovery slot in the collision recovery slot which successfully identifies a plurality of tags even though at least two tags simultaneously replied in one slot to cause collision so that data transmission of at least one identified tag is achieved.

2. The anti-collision method of claim 1, wherein the changing of the length of a collision recovery slot comprises sequentially transmitting a plurality of ACK commands to the at least one identified tag so that the data transmission of at least one identified tag is sequentially achieved in the collision recovery slot.

3. The anti-collision method of claim 1, wherein a success slot to succeed data transmission of the tag, an idle slot where no tags reply, a collision slot where identification fails due to collision, and a collision recovery slot to succeed tag identification even though at least two tags simultaneously replied have different lengths.

4. The anti-collision method of claim 3, wherein the length of the collision recovery slot is greater than the length of other slots.

5. The anti-collision method of claim 3, wherein a maximum value of a time when a reader waits for a response from a tag in the idle slot is calculated as a time required to transmit one bit of the response from the tag.

6. The anti-collision method of claim 1, wherein a frame size is determined so that a system throughput $\eta$ is maximized by defining a ratio of a time required to identify the tag to time of a slot succeeding tag identification as the system throughput.

7. The anti-collision method of claim 6, further comprising:
   calculating a probability of a collision slot based on the number of idle slots and a size of a k-th frame; and
   estimating the number of tags attempting to be identified in the k-th—the k is an arbitrary natural number—frame by applying the calculated probability of the collision slot to a zero estimation algorithm.

8. The anti-collision method of claim 7, wherein the number of the tags attempting to be identified in the (k+1)-th frame is calculated by subtracting the number of tags which are successfully identified in the k-th frame from the number of tags attempting to be identified in the k-th frame.

9. The anti-collision method of claim 8, wherein a size of the (k+1)-th frame is calculated so that a system throughput indicating a ratio of an average of a slot time succeeding the tag identification to a time average of a unit slot is maximized.

10. The anti-collision method of claim 9, wherein a function of the system throughput is $$\eta(L_{k+1}) = \frac{\widetilde{P_{s,k+1}} D_s + E[D_{CR}]}{\widetilde{P_{s,k+1}} D_s + \widetilde{P_{c,k+1}} D_c + \widetilde{P_{i,k+1}} D_i + E[D_{CR}]},$$

where, the $\widetilde{P_{s,k+1}}$ represents a probability of the success slot in the (k+1)-th frame, the $\widetilde{P_{i,k+1}}$ represents a probability of the idle slot in the (k+1)-th frame, the $\widetilde{P_{c,k+1}}$ represents a probability of the collision slot in the (k+1)-th frame, the $E[D_{CR}]$ represents an average time of a collision recovery slot, the $D_s$ represents a time of the success slot, the $D_i$ represents a time of the idle slot, and the $D_c$ represents a time of the collision slot.

11. The anti-collision method of claim 6, wherein a size of the (k+1)-th frame is calculated to make a partial differential function of the system throughput zero, and an integer form is calculated through a ceiling operator when the frame size is a real number.

12. An RFID tag reader apparatus in an RFID system including a plurality of RFID tags, wherein the RFID tag reader apparatus changes a length of a collision recovery slot in the collision recovery slot which successfully identifies a plurality of tags even though at least two tags simultaneously replied in one slot to cause collision so that data transmission of at least one identified tag is achieved.

13. The RFID tag reader apparatus of claim 12, wherein a plurality of ACK commands are sequentially transmitted to the at least one identified tag so that the data transmission of at least one identified tag is sequentially achieved in the collision recovery slot.

14. The RFID tag reader apparatus of claim 12, wherein the RFID tag reader apparatus comprises:
   a receiver configured to receive a tag response and data from the tag;
   a transmitter configured to transmit a Query response command and an ACK command to the tag; and
   a controller configured to generate the Query response command by determining a length of a slot, to generate a Query command by determining a frame size, and to generate the ACK command based on a response from the tag.

15. The RFID tag reader apparatus of claim 14, wherein a success slot to succeed data transmission of the tag, an idle slot where no tags reply, a collision slot where identification fails due to collision, and a collision recovery slot to succeed tag identification even though at least two tags simultaneously replied have different lengths.

16. The RFID tag reader apparatus of claim 15, wherein the length of the collision recovery slot is greater than the length of other slots.

17. The RFID tag reader apparatus of claim 15, wherein a maximum value of a time waiting for a response from a tag in the idle slot is calculated as a time required to transmit one bit of the response from the tag.

18. The RFID tag reader apparatus of claim 12, wherein a frame size is determined so that a system throughput $\eta$ is maximized by defining a ratio of a time required to identify the tag to an occupied time of a slot succeeding tag identification as the system throughput.

19. An RFID system comprising:
   an RFID reader apparatus configured to change a length of a collision recovery slot in the collision recovery slot which successfully identifies a plurality of tags even though at least two tags simultaneously replied in one slot to cause collision so that data transmission of at least one identified tag is achieved; and
   a plurality of RFID tags configured to transmit a unique identification number of a tag in response to a Query response command from the RFID reader, and to transmit data in response to an ACK command to the RFID reader.

* * * * *